(12) United States Patent
Nakamura

(10) Patent No.: US 8,305,349 B2
(45) Date of Patent: Nov. 6, 2012

(54) REMOTE CONTROLLER

(75) Inventor: Takaya Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 844 days.

(21) Appl. No.: 12/372,929

(22) Filed: Feb. 18, 2009

(65) Prior Publication Data

US 2009/0207152 A1 Aug. 20, 2009

(30) Foreign Application Priority Data

Feb. 19, 2008 (JP) ................................. 2008-036824

(51) Int. Cl.
*G06F 3/041* (2006.01)
(52) U.S. Cl. .......................... 345/169; 345/156; 345/173
(58) Field of Classification Search .................. 345/169, 345/173
See application file for complete search history.

(56) References Cited

U.S. PATENT DOCUMENTS

| 5,151,696 | A | * | 9/1992 | Kasahara et al. ............... 341/22 |
|---|---|---|---|---|
| 6,246,019 | B1 | * | 6/2001 | Nakamura et al. ............. 200/6 A |
| 6,784,874 | B1 | * | 8/2004 | Shimizu ........................ 345/173 |
| 7,166,810 | B2 | * | 1/2007 | Hanahara et al. ........... 200/11 R |
| 7,279,647 | B2 | * | 10/2007 | Philipp .......................... 200/5 R |
| 7,375,674 | B2 | * | 5/2008 | Hanahara et al. ............. 341/176 |
| 7,606,483 | B2 | * | 10/2009 | Kurosawa ...................... 396/299 |
| 7,928,961 | B2 | * | 4/2011 | Garfio et al. ................... 345/156 |
| 8,125,446 | B2 | * | 2/2012 | Aramaki ....................... 345/157 |
| 2002/0047945 | A1 | * | 4/2002 | Tanigawa et al. ............. 348/734 |
| 2004/0072596 | A1 | * | 4/2004 | Yamamoto et al. ........... 455/566 |
| 2005/0061650 | A1 | * | 3/2005 | Imamura et al. .............. 200/512 |
| 2005/0264521 | A1 | * | 12/2005 | Liu et al. ........................ 345/156 |
| 2006/0132347 | A1 | * | 6/2006 | Hanahara et al. ............. 341/176 |
| 2006/0201793 | A1 | * | 9/2006 | Hanahara et al. ........ 200/11 TW |
| 2006/0284836 | A1 | * | 12/2006 | Philipp .......................... 345/156 |
| 2007/0019942 | A1 | * | 1/2007 | Kurosawa ...................... 396/287 |
| 2008/0117085 | A1 | * | 5/2008 | Garfio et al. ..................... 341/23 |
| 2009/0207040 | A1 | * | 8/2009 | Nakamura ............... 340/825.69 |
| 2009/0231296 | A1 | * | 9/2009 | Besshi .......................... 345/173 |
| 2010/0245231 | A1 | * | 9/2010 | Aramaki ....................... 345/156 |

FOREIGN PATENT DOCUMENTS

| JP | 2004-221000 A | 8/2004 |
|---|---|---|
| JP | 2005-338949 A | 12/2005 |
| JP | 2006-108003 A | 4/2006 |
| JP | 2006-139997 A | 6/2006 |
| JP | 2007-503052 A | 2/2007 |
| WO | WO 2005/019987 A2 | 3/2005 |

* cited by examiner

*Primary Examiner* — Bipin Shalwala
*Assistant Examiner* — Afroza Chowdhury
(74) *Attorney, Agent, or Firm* — RatnerPrestia

(57) ABSTRACT

A remote controller includes a case having an upper surface having an opening provided therein, an electrostatic touch panel provided at the opening of the case, a board having an upper surface facing the electrostatic touch panel, a push switch provided on upper surface of the board, a cover sheet provided on the upper surface of the board, a control section operable to detect a position on the upper surface of the electrostatic touch panel where the user touches, and a transmitter to send a remote signal in response to the detected position and an activation of the push switch. The electrostatic touch panel can move toward and away from the circuit board. The cover sheet has a deformable projection projecting. The deformable projection has an upper tip contacting the electrostatic touch panel. The deformable projection has substantially a dome shape having a concave lower surface and a convex upper surface.

4 Claims, 7 Drawing Sheets

REMOTE CONTROLLER

FIELD OF THE INVENTION

The present invention relates to a remote controller used to remotely operate various electronic devices.

BACKGROUND OF THE INVENTION

Various electronic devices, such as television receivers, video recorders, or air conditioners, have been recently become more sophisticated, and remote controllers have been accordingly demanded to operate the devices in various reliably.

FIG. 5 is a cross-sectional view of a conventional remote controller 501. Electrostatic touch panel 52 is mounted at an opening provided in an upper surface of case 1 made of insulating resin and having substantially box shape. Electrostatic touch panel 52 includes upper cover 3 made of insulating resin, lower cover 4 made of insulating resin, and electrostatic touch panel element 2 provided between upper cover 3 and lower cover 4. Electrostatic touch panel element 2 includes a sheet having a film shape and plural conductors having substantially strip shapes provided on upper and lower surfaces of the sheet. The conductors extend perpendicularly each other with a predetermined distance. Electrostatic touch panel element 2 includes tail 2A having terminals connected with the conductors. Tail 2A extends rightward out of a lower surface of lower cover 4.

Wiring patterns are provided on upper and lower surfaces of circuit board 5. Push switch 6 is mounted on the upper surface of circuit board 5. Push button 6A projecting from an upper surface of push switch 6 contacts the lower surface of lower cover 4. Electrostatic touch panel element 2 of electrostatic touch panel 52 is connected electrically with the wiring patterns of circuit board 5 via tail 2A and connectors.

Button 7 made of insulating elastic material, such as rubber, has a thin wall portion at the lower part of button 7. The thin wall portion has substantially ring shape. An upper surface of button 7 projects from a through-hole provided in the upper surface of case 1 to allow button 7 to move vertically. Movable contact 7A is provided on a lower surface of button 7. Fixed contacts 5A are provided on the upper surface of circuit board 5. Movable contact 7A faces fixed contacts 5A with a predetermined distance.

Transmitter 8 implemented by, e.g. a light emitting diode (LED) sending a remote signal and control section 9 are mounted on the upper and lower surfaces of circuit board 5. Control section 9 implemented by a semiconductor device, such as a microcomputer, is connected to transmitter 8, electrostatic touch panel 52, push switch 6, and plural fixed contacts 5A via the wiring patterns. Cover 10 made of insulating resin covers a lower surface of case 1.

An operation of remote controller 501 will be described below. A user directs remote controller 501 toward an electronic device and presses the top of certain button 7. Upon being pressed, button 7 moves downward while the thin wall portion elastically deforms, thereby contacting movable contact 7A on the lower of button 7 electrically with fixed contacts 5A. This operation connects fixed contacts 5A electrically with each other via movable contact 7A. In response to this electrical connection, control section 9 sends an infrared signal to the electronic device from transmitter 8 to control the device remotely, for example, to turn on and off the device or to control volume.

While programs or menus are displayed on a display screen of the electronic device, the user has a finger touch an upper surface of upper cover 3, i.e., an upper surface of electrostatic touch panel 52, and moves the finger in a front, back, right, or left direction on the upper surface to slide on the surface. Electric charges in electrostatic touch panel element 2 flow to the finger, and change the capacitance of the touched position of the conductors. Control section 9 detects the position of electrostatic touch panel 52 where the finger touches.

Control section 9 sends a remote signal corresponding to the position to the electronic device from transmitter 8 to move a cursor or pointer on the display screen in response to the movement of the finger, thereby selecting programs or menus.

FIG. 6 is a cross-sectional view of conventional remote controller 501 while upper cover 3 is pressed. When the cursor or the pointer is positioned at a desired program or menu, the user presses the upper surface of upper cover 3 with the finger as shown in FIG. 6. Upon being pressed with the finger, electrostatic touch panel 52 moves downward and, the lower surface of electrostatic touch panel 52 presses push button 6A of push switch 6, thereby activating push switch 6. Control section 9 detects the activation of push switch 6 and directs transmitter 8 to send a remote control signal, thereby allowing the electronic device to display the program or the next menu.

When the pressing of upper cover 3 is released, push button 6A moves upward pushed by a resilient force of push switch 6. Lower cover 4 and electrostatic touch panel 52 accordingly move upward pushed by push button 6A and return to a position shown in FIG. 5.

Thus, the conventional remote controller 501 remotely controls the electronic device by the pressing of plural buttons 7, selects a menu displayed on a display screen with the touching of electrostatic touch panel 52, and further remotely fixes a menu or displays the next menu with the pressing of electrostatic touch panel 52.

FIG. 7 is a cross-sectional view of remote controller 501 having a periphery of electrostatic touch panel 52 pressed. Water drops, oil or, dust may adhere onto the upper surface of electrostatic touch panel 52 or case 1. When the user presses the periphery of, not a center of electrostatic touch panel 52 downward and produces a clearance between case 1 and electrostatic touch panel 52, the water drops, oil, or dust may enter into case 1. Further, electrostatic touch panel 52 is pressed returns back to its original position shown in FIG. 5 by a spring back force of push button 6A itself of push switch 6. The user may not be able to press electrostatic touch panel 52 with a preferable feeling if electrostatic touch panel 52 has a large size.

SUMMARY OF THE INVENTION

A remote controller includes a case having an upper surface having an opening provided therein, an electrostatic touch panel provided at the opening of the case, a board having an upper surface facing the electrostatic touch panel, a push switch provided on upper surface of the board, a cover sheet provided on the upper surface of the board, a control section operable to detect a position on the upper surface of the electrostatic touch panel where the user touches, and a transmitter to send a remote signal in response to the detected position and an activation of the push switch. The electrostatic touch panel can move toward and away from the circuit board. The cover sheet has a deformable projection projecting. The deformable projection has an upper tip contacting the electrostatic touch panel. The deformable projection has substantially a dome shape having a concave lower surface and a convex upper surface.

The remote controller is highly waterproof and resistant to dust, and can be operated with a preferable feeling.

DETAILED DESCRIPTION OF THE INVENTION

Figure 1:
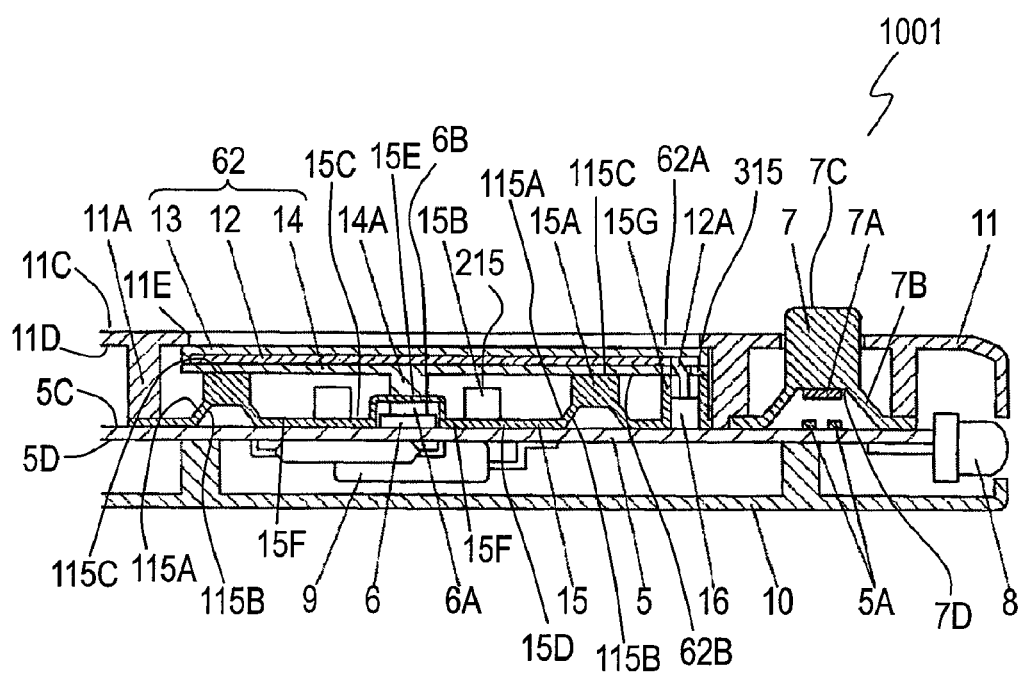
FIG. 1 is a cross-sectional view of a remote controller in accordance with an exemplary embodiment of the present invention.
Figure 2A:
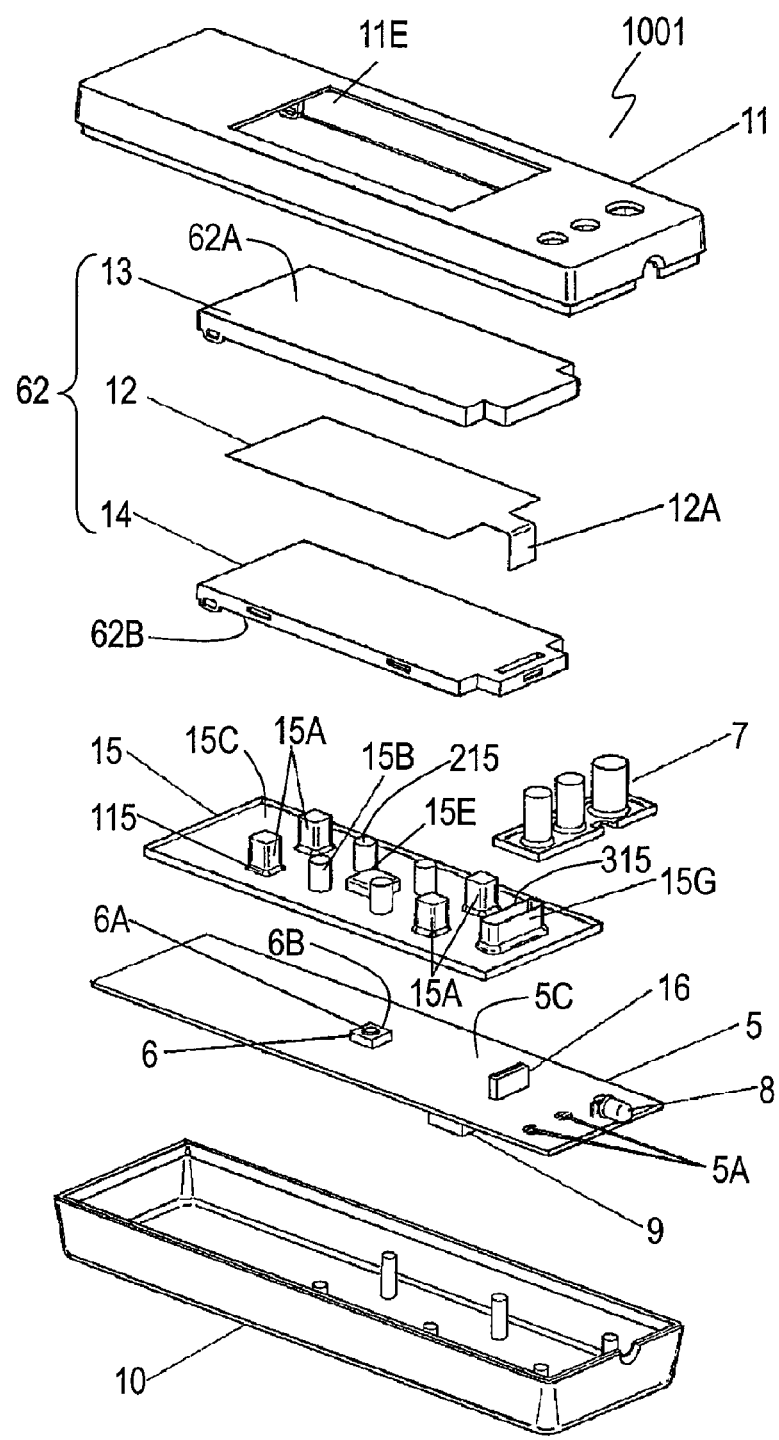
FIG. 2A is an exploded perspective view of the remote controller in accordance with the embodiment.

FIGS. 1 and 2A are a cross-sectional view and an exploded perspective view of remote controller 1001 in accordance with an exemplary embodiment of the present invention, respectively. Case 11 is made of insulating resin, such as polystyrene or ABS resin, and has substantially a box shape. Opening 11E is provided in upper surface 11C of case 11. Electrostatic touch panel 62 is mounted at opening 11E of case 11. Electrostatic touch panel 62 includes upper cover 13 made of insulating resin, lower cover 14 made of insulating resin, and electrostatic touch panel element 12 provided between upper cover 13 and lower cover 14. Electrostatic touch panel 62 has upper surface 62A which is an upper surface of upper cover 13 and lower surface 62B which is a lower surface of lower cover 14, opposite to upper surface 62A.

Figure 2B:
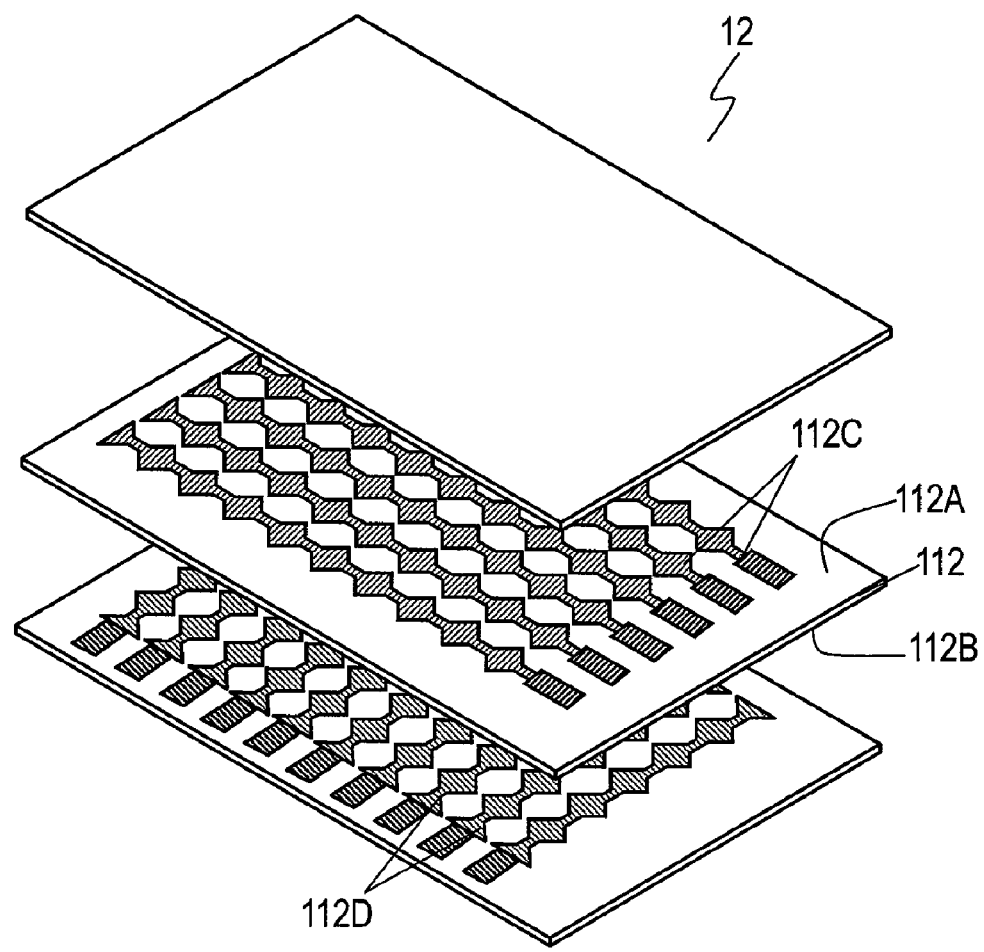
FIG. 2B is an exploded perspective view of an electrostatic touch panel element of the remote controller in accordance with the embodiment.

FIG. 2B is an exploded perspective view of electrostatic touch panel element 12. Electrostatic touch panel element 12 includes sheet 112 having a film shape, conductors 112C having substantially strip shapes provided on upper surface 112A of sheet 112, and conductors 112D having substantially strip shapes provided on lower surface 112B of sheet 112. Conductors 112C extend in parallel with each other. Conductors 112D extend in parallel with each other. Conductors 112C are arranged perpendicularly to conductors 112D across sheet 112 with a predetermined distance (the thickness of sheet 112). Electrostatic touch panel element 12 includes tail 12A having terminals connected with conductors electrodes 112C and 112D. Tail 12A extends rightward externally out of the lower surface of lower cover 14.

Circuit board 5 is made of insulating material, such as paper-reinforced phenol or glass-reinforced epoxy. Wiring patterns formed made of conductive material, such as copper foil, are provided on upper surface 5C and lower surface 5D of circuit board 5. Push switch 6 is mounted onto upper surface 5C of circuit board 5. Tail 12A of electrostatic touch panel 62 is connected electrically with the wiring patterns on circuit board 5 via connector 16 provided on upper surface 5C of circuit board 5. Push switch 6 has push button 6A projecting from upper surface 6B, and is activated when push button 6A is pressed by a predetermined distance.

Cover sheet 15 provided beneath electrostatic touch panel 62 is made of elastic insulating material, such as rubbers or elastomer. Cover sheet 15 is provided on upper surface 5C of circuit board 5 to cover upper surface 5C of circuit board 5 and push switch 6. Lower surface 15D of cover sheet 15 is situated on upper surface 5C of circuit board 5. Push switch 6 is located between lower surface 15D of cover sheet 15 and upper surface 5C of circuit board 5. Ribs 11A projecting from lower surface 11D of case 11 contacts ends of upper surface 15D of cover sheet 15.

Cover sheet 15 has board cover 15F located on upper surface 5C of circuit board 5, deformable projections 15A projecting from upper surface 15C, stoppers 15B projecting from upper surface 15C, and switch cover 15E projecting from upper surface 15C to cover push switch 6. Switch cover 15E is surrounded by deformable projections 15A. Board cover 15F connects deformable projections 15A, stoppers 15B, and switch cover 15E. Deformable projection 15A has substantially a dome shape having concave lower surface 115B and convex upper surface 115A (upper tip 115C). Upper surface 115A (upper tip 115C) of deformable projection 15A contacts lower surface 62B of electrostatic touch panel 62. Stopper 15B has a circular columnar shape and is less deformable than deformable projection 15A. Stopper 15B is lower than deformable projection 15A, accordingly providing a clearance between upper surface 215 of stopper 15B and lower surface 62B of electrostatic touch panel 62 (lower cover 14). This clearance is slightly larger than a distance in which electrostatic touch panel 62 is movable.

Tubular wall portion 15G having a tubular shape projects from upper surface 15C at an end of cover sheet 15. Tubular wall portion 15G covers connector 16 and tail 12A connected to connector 16. Upper tip 315 of tubular wall portion 15G elastically contacts lower surface 62B of electrostatic touch panel 62 (lower cover 14).

Button 7 is made of elastic insulating material, such as rubbers or elastomer. Button 7 has thin wall portion 7B having substantially a dome shape at the lower portion button 7. Upper surface 7C of button 7 projects vertically movably from holes provided in upper surface 11C of case 11. Movable contact 7A is provided on bottom 7D of button 7. Fixed contacts 5A face movable contact 7A with a predetermined distance.

Transmitter 8 implemented by, e.g. a light emitting diode (LED) for sending a remote signal and control section 9 implemented by a semiconductor device, such as a microcomputer, are provided on upper surface 5C and lower surface 5D of circuit board 5. Control section 9 is connected to transmitter 8, electrostatic touch panel 62, push switch 6, and fixed contacts 5A via the wiring patterns. Cover 10 made of insulating resin covers a lower surface of case 11.

Electrostatic touch panel 62 is mounted to opening 11E of case 11 and accommodated in case 11. Circuit board 5 has upper surface 5C facing electrostatic touch panel 62 and is accommodated in case 11. Push switch 6 is provided on upper surface 5C of circuit board 5, and is activated upon being pressed with electrostatic touch panel 62. Cover sheet 15 has deformable projections 15A projecting and reaching electrostatic touch panel 62. Deformable projection 15A has substantially a dome shape having concave lower surface 115B and convex upper surface 115A. Electrostatic touch panel 62 moves toward and away from circuit board 5.

Figure 3A:
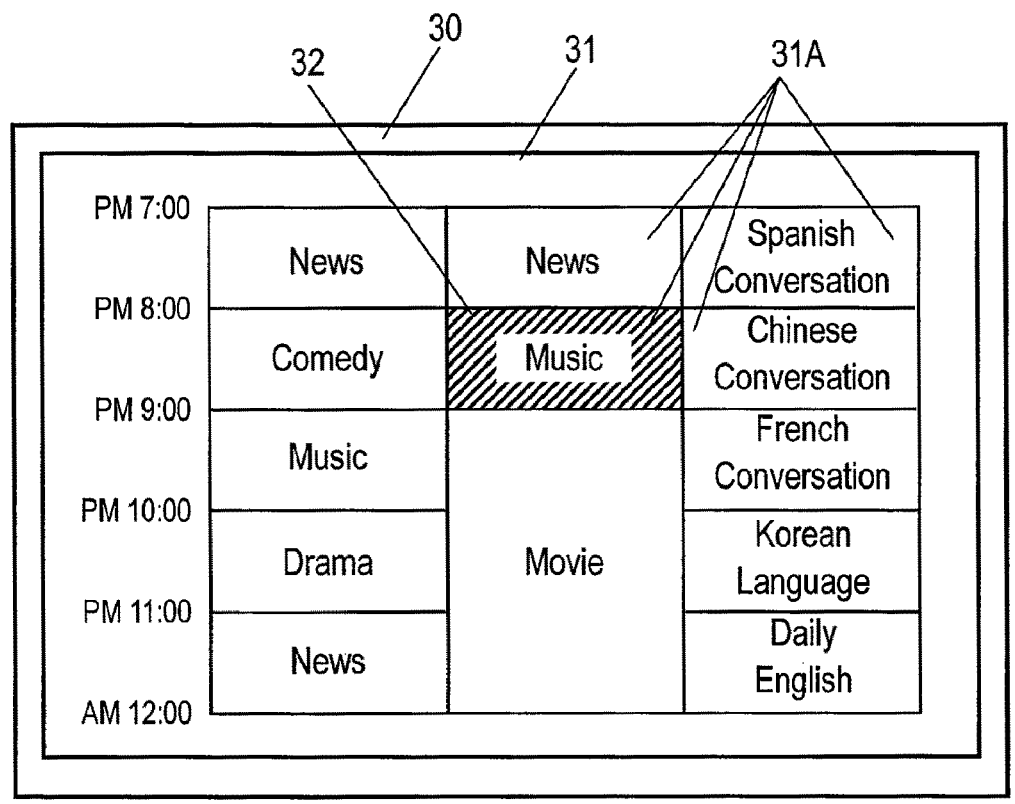
FIGS. 3A and 3B are front views of an electronic device in accordance with the embodiment.
Figure 3B:
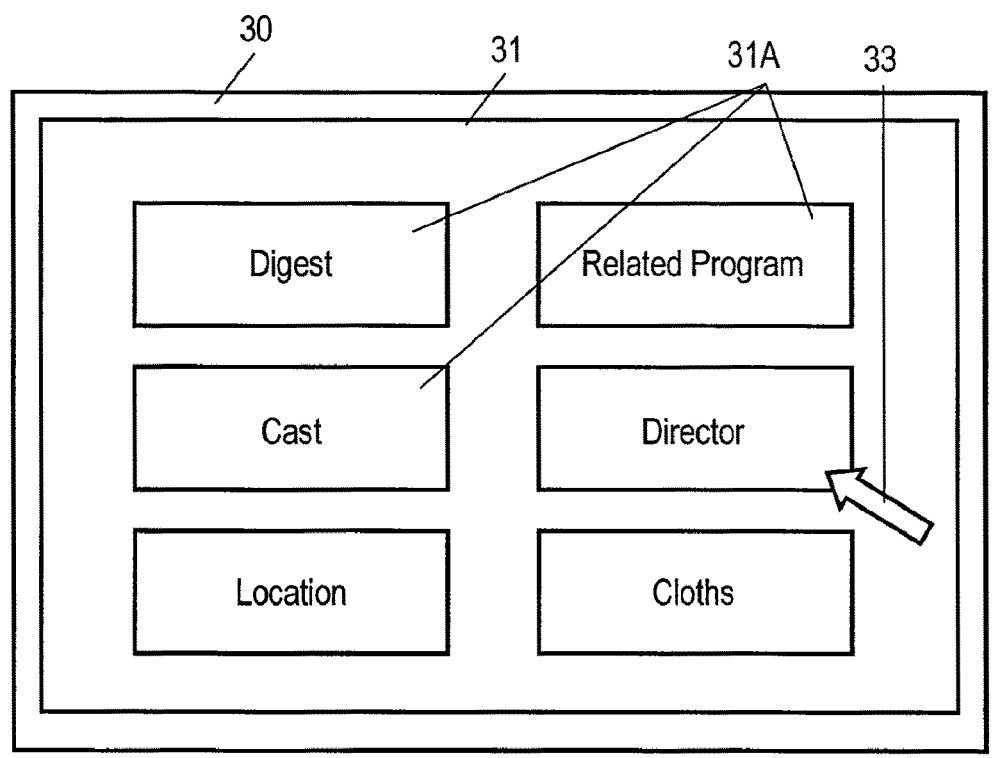

An operation of remote controller 1001 will be described below. FIGS. 3A and 3B are front views of electronic device 30 controlled by remote controller 1001.

When a user has a finger press the upper surface of button 7 while directing remote controller 1001 toward electronic device 30, button 7 moves downward with elastic deformation of thin wall portion 7B. This allows movable contact 7A on lower surface 7D of button 7 to contact electrically fixed contacts 5A, thereby connecting fixed contacts 5A electrically with each other via movable contact 7A. In response to the electrical connection, control section 9 sends an infrared signal from transmitter 8 to electronic device 30 to control the device remotely, for example, to turn on and off the device or to control volume.

While options 31A, such as programs or menus, are displayed on a display screen of electronic device 30, as shown in FIGS. 3A and 3B, the user touches upper surface 62A of electrostatic touch panel 62 with a finger and moves the finger in a front, back, left and right direction as if sliding on the upper surface to control the electronic device. Electrical charges of electrostatic touch panel element 12 of electrostatic touch panel 62 flow to the finger, so that the capacitance of the touch position of conductors 112C and 112D changes. In response, control section 9 detects the position where the user touches on upper surface 62A of electrostatic touch panel 62. Control section 9 sends a remote signal corresponding to the detected position from transmitter 8 to electronic device 30. Electronic device 30 then selects one of options 31A, such as programs or menus by moving cursor 32 or pointer 33 displayed on display screen 31 in response to the remote signal.

Figure 4:
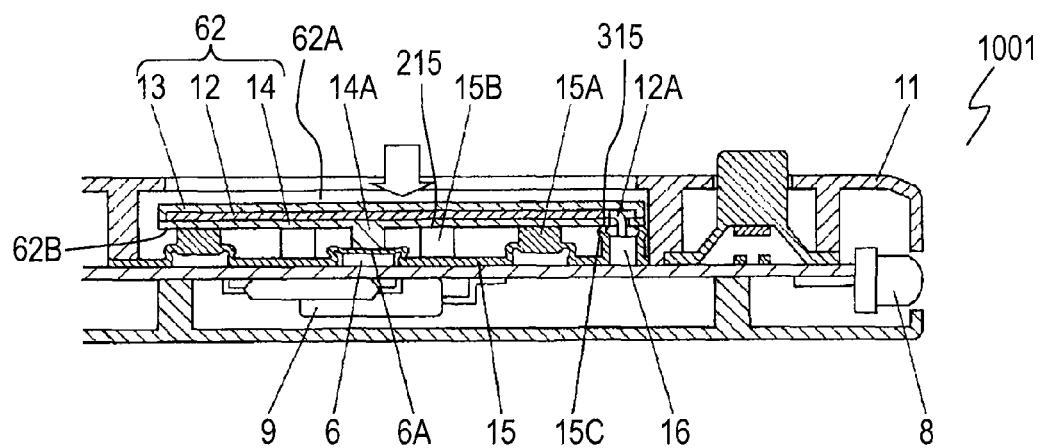
FIG. 4 is a cross-sectional view of the remote controller while being pressed in accordance with the embodiment.
Figure 5:
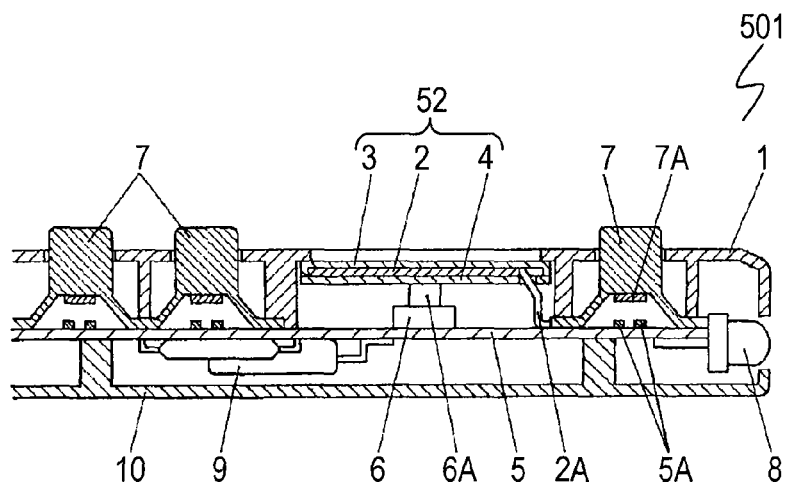
FIG. 5 is a cross-sectional view of a conventional remote controller.
Figure 6:
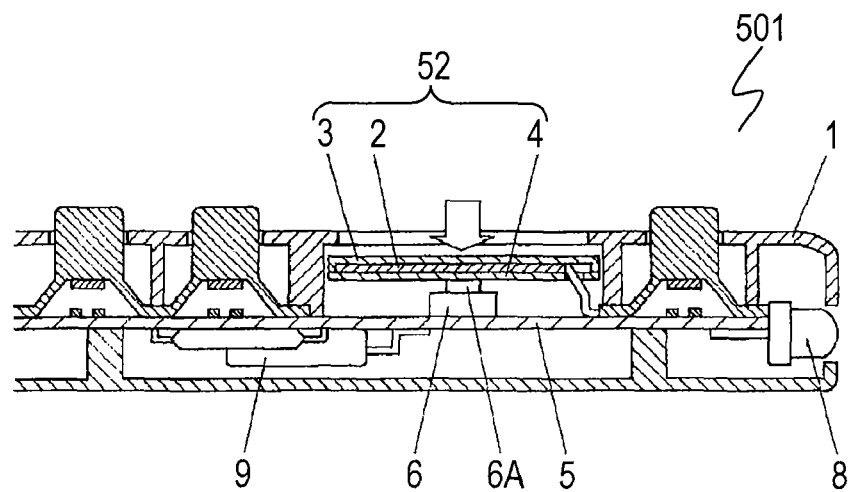
FIG. 6 is a cross-sectional view of the conventional remote controller while being pressed.
Figure 7:
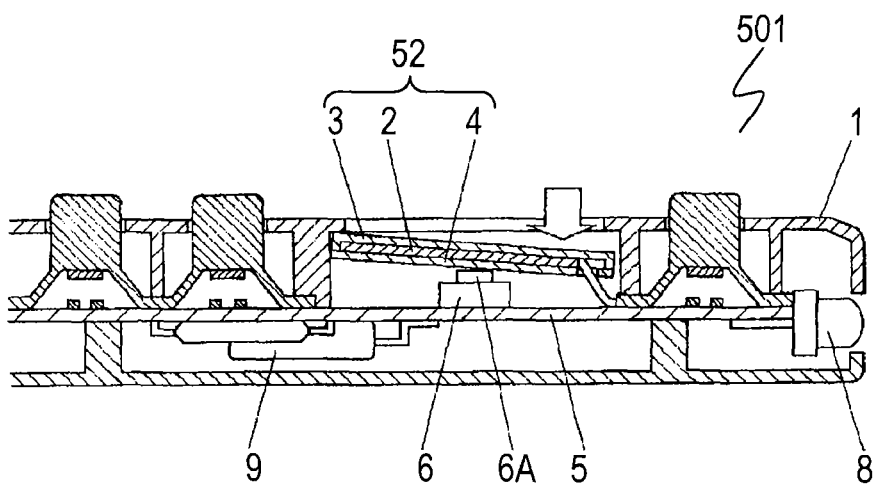
FIG. 7 is a cross-sectional view of the conventional remote controller while being pressed.

FIG. 4 is a cross-sectional view of the remote controller 1001 while operating. When cursor 32 or pointer 33 is located one of the options 31A, such as programs or menus, on the display screen, the user presses upper cover 13, i.e., upper surface 62A of electrostatic touch panel 62. Then, lower surface 62B of electrostatic touch panel 62 presses deformable projections 15A to allow deformable projections 15A to deform elastically, causing upper tip 115C to move toward circuit board 5 with a click feeling, as shown in FIG. 4. According to this movement, electrostatic touch panel 62 moves downward toward circuit board 5. At this moment, tail 12 of electrostatic touch panel 62 and upper tip 315 of tubular wall portion 15G guarding connector 16 are pressed expanded outward by elastic deformation, being kept coming into contact with lower surface 62B of electrostatic touch panel 62.

When electrostatic touch panel 62 moves downward, projection 14A projecting from lower surface 62B presses button 6A of push switch 6 via switch cover 15E of cover sheet 15 by the predetermined distance, thus activating push switch. Upon detecting the activation of push switch 6, control section 9 sends a remote signal from transmitter 8 to electronic device 30 to determine desired option 31A, such as the reserving a program or the displaying a next menu.

As described above, remote controller 1001 remotely controls various functions, such as power switching and volume control, of the electronic device by pressing button 7, selecting a menu, such as programs, displayed on display screen 31 by touching electrostatic touch panel 62, and further determining the menu or display the next menu by pressing electrostatic touch panel 62.

Upon electrostatic touch panel 62 being pressed, deformable projections 15A deform with a click feeling. The user can, therefore, press electrostatic touch panel 62 by just a moderate pressure with a preferable click feeling.

When electrostatic touch panel 62 is pressed, an inside of case 11 communicates with an outside through opening 11E of case 11. In the remote controller in accordance with the embodiment, however, cover sheet 15 provided beneath opening 11E covers upper surface 5C of circuit board 5 and push switch 6. Additionally, ribs 11A projecting from lower surface 11D of case 11 elastically ends of upper surface 15C of cover sheet 15. Push switch 6 mounted onto circuit board 5 is blocked from the outside of case 11, providing remote controller 1001 with high waterproof and resistance to duct.

Water drops, oil or dust may adhere onto electrostatic touch panel 62 or upper surface 11C of case 11. Even when electrostatic touch panel 62 is pressed downward and forms a clearance between opening 11E of case 11 and electrostatic touch panel 2, cover sheet 15 prevents the water drops, oil, or dust from being attached onto circuit board 5 or push switch 6.

Tail 12A and connector 16 of electrostatic touch panel 62 are covered with tubular wall portion 15G of cover sheet 15. Upon electrostatic touch panel 62 being pressed, electrostatic touch panel 62 causes tubular wall portion 15G to elastically deform while lower surface of 62B of electrostatic touch panel 62 contacts upper tip 315 of tubular wall portion 15G, thereby preventing the water drops, oil, or the dust from adhering onto tail 12A and connector 16.

Stoppers 15B project from upper surface 15C of cover sheet 15 toward electrostatic touch panel 62. When an impact or a large force presses electrostatic touch panel 62 strongly from above, lower surface 62B of electrostatic touch panel 62 (lower cover 14) contacts respective upper tips 215 of stoppers 15B elastically. Stoppers 5B absorb this force eventually with its elastic deformation, and prevent push switch 6 and components provided on upper surface 5C of circuit board 5 from damage.

Push switch 6 of remote controller 1001 has button 6A to activate the switch. In remote controller 1001 in accordance with the embodiment, push switch 6 may include plural fixed contacts provided on upper surface 5C of circuit board 5 and a movable contact facing the fixed contacts with a predetermined clearance. Alternatively, push switch 6 may include fixed contacts provided on upper surface 5C of circuit board 5 and a movable contact which is made of conductive thin metal sheet and has a dome shape provided above the fixed contacts.

According to the embodiment, terms indicating directions, such as "upper", "lower" or "beneath" indicate relative directions depending on positional relationship between components, such as electrostatic touch panel 62 and circuit board 5, of remote controller 1001, and do not indicate absolute directions, such as a vertical direction.

What is claimed is:
1. A remote controller comprising:
a case having an upper surface, the upper surface having an opening provided therein;
an electrostatic touch panel provided at the opening of the case, the electrostatic touch panel having a lower surface and an upper surface, the upper surface of the electrostatic touch panel being adapted to allow a user to touch the upper surface of the touch panel;
a circuit board having an upper surface facing the electrostatic touch panel;
a push switch provided on upper surface of the circuit board, the push switch being activated upon being pressed with the electrostatic touch panel;
a cover sheet provided on the upper surface of the circuit board, the cover sheet covering the push switch;
a control section operable to detect a position on the upper surface of the electrostatic touch panel where the user touches; and
a transmitter to send a remote signal in response to the detected position and an activation of the push switch, wherein the electrostatic touch panel can move toward and away from the circuit board, the cover sheet has a deformable projection projecting, the deformable projection having an upper tip contacting the electrostatic touch panel, and the deformable projection includes:
- a lower portion having substantially a dome shape having a concave lower surface and a convex upper surface; and
- an upper portion projecting upward from the lower portion.

2. The remote controller of claim 1, wherein the cover sheet further has a stopper projecting toward the electrostatic touch panel.

3. The remote controller of claim 1, wherein the cover sheet covers the push switch at a portion of the cover sheet different from the deformable projection.

4. The remote controller of claim 3, wherein the push switch is activated upon being pressed with the electrostatic touch panel through the portion of the cover sheet different from the deformable projection.

* * * * *